Oct. 13, 1942.  L. C. RUBIN ET AL  2,298,593
APPARATUS FOR CATALYTIC CRACKING
Filed Nov. 12, 1938  2 Sheets-Sheet 1

INVENTORS
Louis C. Rubin
Walter B. Montgomery
William J. Degnen
BY
ATTORNEY

Oct. 13, 1942.  L. C. RUBIN ET AL  2,298,593
APPARATUS FOR CATALYTIC CRACKING
Filed Nov. 12, 1938  2 Sheets-Sheet 2
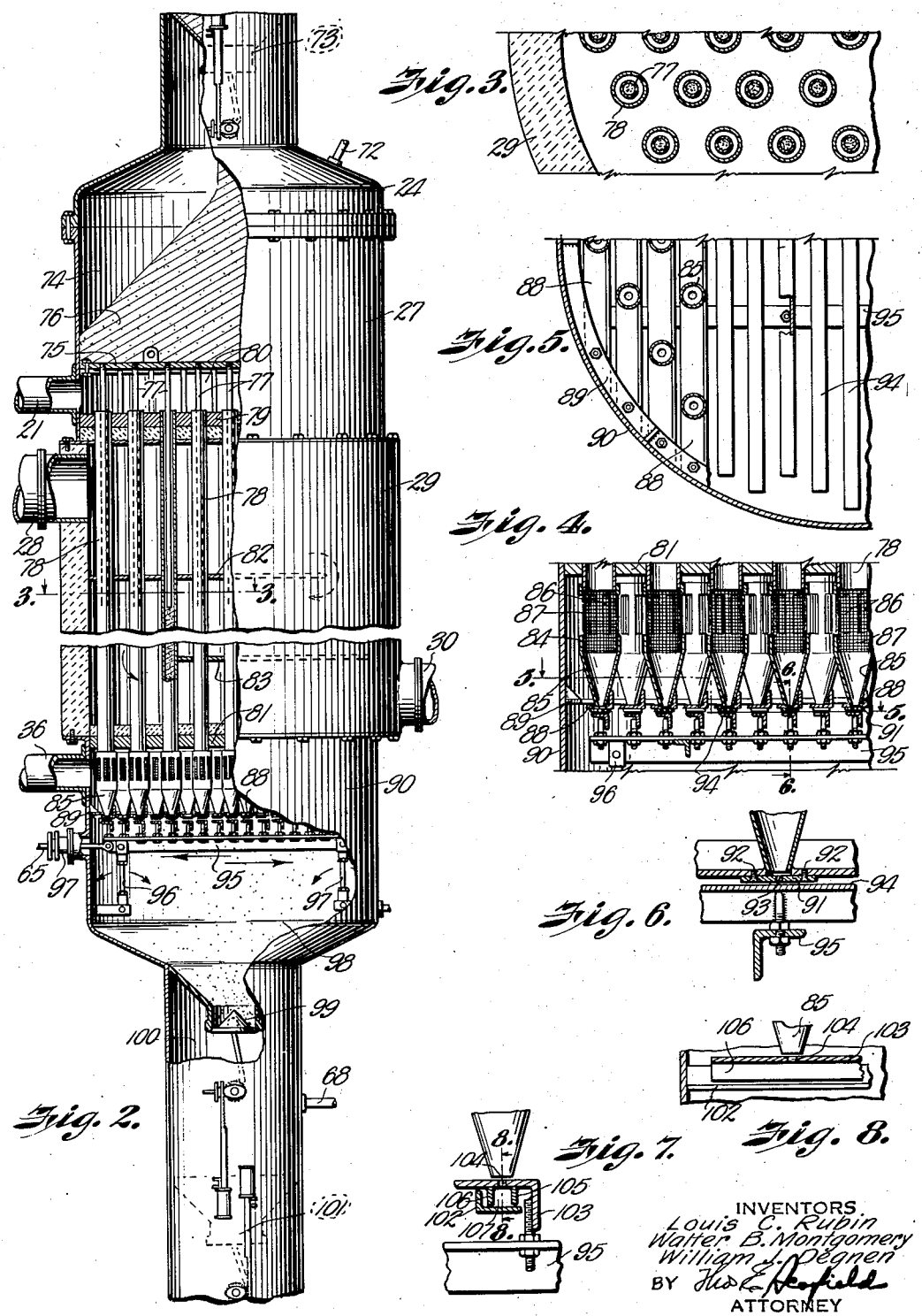

Patented Oct. 13, 1942

2,298,593

UNITED STATES PATENT OFFICE 2,298,593

APPARATUS FOR CATALYTIC CRACKING

Louis C. Rubin, West Caldwell, Walter B. Montgomery, Summit, and William J. Degnen, Cranford, N. J., assignors to The M. W. Kellogg Company, New York, N. Y., a corporation of Delaware Application November 12, 1938, Serial No. 240,100

1 Claim. (Cl. 23—288)

Our invention relates to a method and apparatus for catalytic cracking and more particularly to an improved method for cracking with the aid of a catalyst which is continuously supplied to the reactants and continuously removed from the reaction zone.

It has been suggested, in the practice of catalytic cracking, to flow catalyst material in finely divided form through the catalyst chamber in contact with the reactant so that the catalyst material in a constant state of activity will be continuously supplied, thus enabling a closer control over the desired products to be exercised and a higher yield to be obtained.

In the suggestions of the prior art, the catalyst was made to flow countercurrent to the reactants. We have discovered that, when countercurrent flow of catalytic material to the reactants is practiced, the hydrocarbons produced, as for example, gasoline, pass progressively through more active catalysts. We have found that, when the nascent low boiling hydrocarbons resulting from catalytic cracking thus come in contact with a more active catalyst, they are in part destroyed. This results in an increased dry gas yield and a decreased gasoline yield in the case of cracking heavy hydrocarbons to light hydrocarbons suitable for use as a motor fuel. We have discovered, too, particularly at high velocities of vapor flow, that in countercurrent flow static catalyst may exist or that the catalyst flow is reversed, thus reducing the benefits obtained from the use of a continuously moving catalyst.

One object of our invention is to provide a novel method of catalytic cracking employing a moving catalyst.

Another object of our invention is to provide a novel apparatus capable of carrying out the method of our invention.

Other and further objects of our invention will appear from the following description.

In the accompanying drawings which form part of the instant specification and are to be read in conjunction therewith and in which like reference numerals are used to represent like parts in the various views, Figure 1 is a schematic view of apparatus capable of carrying out the method of our invention.

Figure 2 is a sectional view of a catalytic cracking chamber forming part of the apparatus of our invention and capable of carrying out the method of our invention.

Figure 3 is a fragmentary sectional view taken on a line 3—3 of Figure 2.

Figure 4 is an enlarged fragmentary view of a detail showing the discharge end of the reaction tubes.

Figure 5 is a sectional view taken on a line 5—5 of Figure 4.

Figure 6 is a sectional view on an enlarged scale, taken on a line 6—6 of Figure 4.

Figure 7 is a fragmentary view on an enlarged scale of a modified form of a catalyst discharge assembly enabling a more accurate control of the catalyst flow to be exercised.

Figure 8 is a sectional view taken on a line 8—8 of Figure 7.

Figure 1:
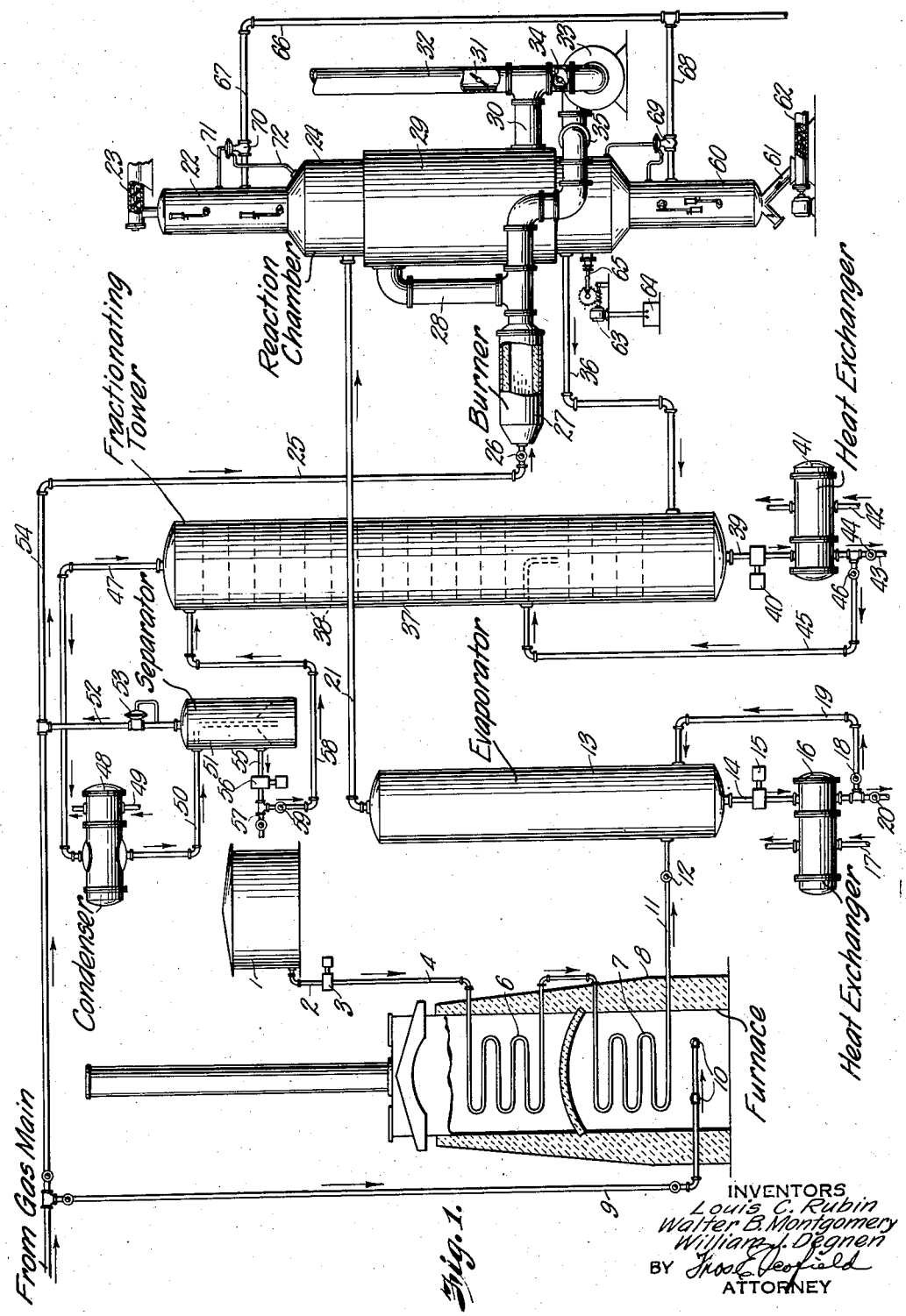

In general, our invention contemplates a method of catalytic cracking in which the hydrocarbon vapors to be cracked are passed through tubes containing a cracking catalyst concurrently with a catalyst material in finely divided form. Concurrent flow enables us to exercise a more accurate control of the catalyst flow, decreases the amount of static catalyst to a minimum, decreases the dry gas yield and increases the yield of desired hydrocarbons. Furthermore, we have found that in catalytic cracking with concurrent flow of catalyst, the octane number is higher when cracking to gasoline-like hydrocarbons. In cracking to form Diesel fuel, the maximum pour point was decreased from about −10° to below −35° F.

Any suitable cracking catalyst may be employed. We prefer to use a finely divided silica catalyst on which there has been hydrolytically adsorbed a small amount of aluminum oxide.

More particularly referring now to the drawings, the hydrocarbons to be cracked may be of any suitable type and are taken from a storage tank 1 through line 2 and pumped by pump 3 through pipe 4 through the coils 6 and 7 of a furnace 8 in which fuel, such as gas from a gas main 9, is burned in burners 10 to heat the oil to the desired cracking temperature, which may be anywhere between 800° F. and 950° F. or higher. The heated oil is withdrawn from the furnace 8 through pipe 11 controlled by valve 12 and passed into an evaporator 13 in which the oil is separated into vapors and unvaporized oil. The unvaporized oil is withdrawn from the evaporator through pipe 14 and pumped by pump 15 through a heat exchanger 16 which is supplied with a cooling medium through pipe 17. A portion of the cool oil may be returned to the bottom of the evaporator by opening valve 18 and permitting the cooled, unvaporized oil to flow through pipe 19 into the bottom of the evaporator 13 to control the bottom temperature thereof. The remainder of the unvaporized oil is withdrawn from the process through pipe 20. The vapors withdrawn from the top of the evaporating zone 13 through pipe 21 are at the desired cracking temperature. If desired, they may be superheated by any suitable means (not shown). Fresh, finely divided catalyst from any suitable source is passed into a hopper 22 by a conveyor 23 for passage through cracking reaction tubes housed within the reaction chamber 24 and shown in detail in Figure 2. The arrangement is such that the hot vapors, at cracking temperature, flow downwardly through the reaction tubes with the catalyst at a rate sufficient to provide a time interval in which the desired cracking reaction may take place. Inasmuch as cracking is an endothermic reaction, the temperature of the vapors during their passage through the reaction zone is maintained by means of heat exchange. Gas is supplied from the gas main through pipe 25 past valve 26 to a burner 27 in which hot gases of combustion are generated. The hot gases of combustion pass through a conduit 28 into a jacket 29 in heat exchange with the reaction tubes. The exhaust gases are withdrawn from the hot jacket through duct 30. The larger portion thereof pass chamber 31 for passage through duct 32 to a flue.

A portion of the spent gases is taken by blower 33 past control damper 34 for passage through duct 35 for admixture with the freshly generated hot gases of combustion. The admixing of the spent gases with the hot gases enables a control of the temperature of the resultant mixture to be exercised. It is contemplated as well to pass the heating medium through the jacket in a countercurrent direction to the reactant vapors and catalyst, introducing the medium around the lower ends of the catalyst tubes in the location of the pipe 30 and discharging the heating medium through pipe 28. The cracked vapors are separated from the spent catalytic material and withdrawn from the reaction chamber through pipe 36 and introduced into a fractionating tower 37 which may be of any suitable type, as for example, one equipped with bubble trays 38. Reflux condensate is withdrawn from the bottom of the fractionating tower 37 through pipe 39 and pumped by pump 40 through heat exchanger 41 which is supplied with a cooling medium through pipe 42. Cycle stock is withdrawn from the heat exchanger through pipe 43, controlled by valve 44. Control reflux is passed to the fractionating tower through pipe 45, controlled by valve 46. The cracked vapors and fixed gases are removed overhead through pipe 47 and passed through a condenser 48, which is supplied with a cooling medium through pipe 49. The condensate is withdrawn from the condenser through pipe 50 and passed into a separator 51 from which the fixed gases are withdrawn through pipe 52 controlled by back pressure controlled valve 53, for passage to the fuel gas main 54.

Gasoline is withdrawn from the separator 51 through pipe 55 and pumped by pump 56 through pipe 57 to storage. A portion of the gasoline passes through pipe 58 controlled by valve 59 for introduction to the top of the fractionating tower 37 as a control reflux to control the top tower temperature. The spent catalyst passes into the catalyst discharge hoppers 60 from which it is withdrawn through duct 61 for introduction to a conveyor 62 for passage to a catalyst revivifying operation (not shown). The flow of catalyst is controlled by a feeding mechanism operated by an electric motor 63 controlled by control mechanism 64. The feeding mechanism reciprocates a shaft 65 which is connected to the flow control arrangement shown in greater detail in Figure 2. The vapors to be cracked and the cracked products are prevented from escaping through catalyst introduction hopper 22 and catalyst discharge hopper 60 by means of a sealing fluid such as an inert gas or steam introduced from a sealing fluid main 66 through pipes 67 and 68. Sealing gas is controlled by control valves 69 and 70. The control valves are diaphragm valves controlled by the differential pressure existing within the reaction chamber and in the sealing hoppers. The pressure in the hopper 22 is communicated through pipe 71, the pressure within the reaction chamber being communicated through pipe 72. The arrangement is such that the pressure within the hopper 22 is maintained above that existing within the reaction chamber. A similar arrangement operates the valve 69 at the discharge side of the reaction chamber.

Referring now to Figure 2, the flow of the catalyst is controlled by a valve 73, the catalyst passing into an upper chamber 74 formed within the reaction chamber 24 by a tube sheet 75 which acts as a distributing plate to distribute the catalyst 76 to the feeder tubes 77. The arrangement is such that accumulations of stagnant catalyst adjacent the upper openings of the catalyst tubes 78 is avoided. The feeder tubes 77 extend some distance downwardly into the reaction tubes 78. Below the feeder tube sheet 75 we position a tube sheet 79 in which the catalyst tubes 78 are welded or rolled. The space 80 between the tube sheet 75 and the tube sheet 79 serves as an inlet vapor space to which the incoming hot vapors to be cracked are introduced through pipe 21. The feeder tubes 77 feed the catalyst to the catalyst tubes 78. The length of the feeder tubes will determine the height of the catalyst material maintained within the catalyst tubes. By varying the length of the feeder tubes, the amount of catalyst in the catalyst tubes is determined. This enables us to change the amount of catalyst for cracking various types of stock and employing different types of catalytic material.

The lower portions of the catalyst tubes are welded or rolled in a lower tube sheet 81. A plurality of baffles 82 and 83 are disposed around the exterior of catalyst tubes 78 transversely of the heating jacket 29 to direct the flow of heating medium which is introduced to the heating jacket through duct 28 and withdrawn therefrom through duct 30. Heat exchange between the heating medium and the reactants within the catalyst tubes supplies heat to the endothermic cracking reaction.

In order to remove the catalyst and the vapors separately from the lower ends of the catalyst tubes, we provide means to effect the separation of the catalyst and the vapors. It will be noted that the catalyst tubes 78 extend beyond the lower tube sheet 81. To these extensions are fitted elements comprising upper cylindrical portions 84 and lower conical portions 85. The cylindrical portions 84 are provided with slots 86, normally covered by screens 87. The screens are made with a mesh sufficiently small to permit the discharge of the vapors while preventing the catalyst from passing therethrough.

The tube ends are arranged in rows corresponding with the catalyst tubes to which they are fitted. To facilitate the placing or fitting of the tube ends on the tubes, they are secured to structural members such as angles 88. The angles in turn are supported at their ends by means of a ring 89, carried by the shell 90 of the reaction chamber. Under the discharge end of each cone we secure an orifice plate 91 by means of tapped screws 92 enabling it to be removed for replacement by plates 91 having respective orifices 93 of different sizes. The size of the orifice 93 controls the rate at which the catalyst material will be discharged from the cone.

The arrangement is such that, in fitting tube ends to the tubes, it is only necessary to position their supporting angles 88 below the tubes so that the tube ends slide easily into the cylindrical portions of the discharge assembly.

A plurality of angles 94 are supported by a cross member 95 and are positioned beneath and adjacent respective lines of orifices 93. The cross member 95 is pivotally supported on links 96 and 97 as can readily be seen by reference to Figure 2. The reciprocating rod 65, driven as indicated hereinabove, passes through a stuffing box 97 and is adapted to actuate the gridwork formed by cross members 95 and angles 94. The reciprocation of the grid alternately moves the angles clear of the respective orifices 93 and to a position blocking the same. When the grid is clear of the orifices, catalyst material will flow from the discharge cones 85 to the space 98 beneath the discharge arrangement. From the space 98 the catalyst material passes by valve 99 into the sealing hopper 100 from which it is discharged past valve 101. The sealing gas for the lower hopper is introduced through pipe 68 controlled by control valve 69 as described hereinabove.

The slots 86 in the base of the discharge cones are made considerably larger in total area than the internal cross sectional area of the tubes. As shown, the area of the slot is substantially four times as large as the internal cross sectional area of the tubes. This enables ready separation of the cracked vapors from the spent catalyst material to be effected. The discharge valves 99 and 101 and the catalyst feeding valve 73 are operated either by electrical or fluid pressure control mechanism in accordance with a time cycle regulated to introduce the catalyst at definite intervals in amounts proportioned according to the rate of catalyst flow from the tubes. A level gauge (not shown) may be employed in an upper feed compartment. A level gauge may be employed to indicate the amount of catalyst material in a lower discharge compartment. The change in levels of the upper and lower hoppers will serve to indicate the rate of catalyst flow through the catalyst chamber.

In the form of the discharge portion of the cones shown in Figures 7 and 8, the angles 102 are stationary while the angles 103 secured to the cross members 95 are movable by the shaker mechanism. The angles 103 are provided with orifices 104 disposed beneath the outlet of each discharge cone 85. A pair of longitudinal, downwardly projecting members 105 and 106 form an elongated chamber 107 with the bottom of stationary angle 102. The catalyst is adapted to fill the chamber 107. Movement of the shaker device to the right, as view in Figure 7, is adapted to dump the catalyst material. As the catalyst material is being dumped, the imperforate portion of the angle 103 moves across the outlet of the discharge cone 85. The arrangement is a volumetric discharge device in which the speed of reciprocation of the shaker device will accurately control the flow of catalyst.

In a test operation, the oil being charged was heated to a transfer temperature of 925° F. and was charged at this temperature into the catalyst chamber under a pressure of about 13 pounds per square inch. The fractionating tower was held at a top temperature of 240° F. and, charging 9020 pounds per hour of 21° A. P. I. charging stock, 1590 pounds per hour of 63.5 A. P. I. gasoline was produced. 4388 pounds per hour of 27° A. P. I. cycle stock was withdrawn from the bottom of the fractionating tower. 2480 pounds per hour of 7.8° A. P. I. tar bottoms were withdrawn from the bottom of the evaporating tower. About 335 pounds per hour of gas was introduced into the gas mains from the separator. This gas had a molecular weight of about 23. Burner 27, generating hot gases of combustion for the heating jacket, consumed 69.2 pounds per hour of gas. The furnace 8 consumed 374 pounds per hour of fuel gas. A pressure of 13 pounds per square inch was maintained in the upper sealing hopper 22 and a pressure of 6 pounds per square inch was maintained in the lower sealing hopper 60. It required about 58.2 pounds per hour of sealing gas to maintain the desired pressure. The gases of combustion entered the heating jacket at a temperature of about 1425° F. and were withdrawn from the heating jacket through duct 30 at a temperature of 1000° F.

The rate of flow of the heating gas through the heating jacket was 8300 pounds per hour.

It will be seen that we have accomplished the objects of our invention. We have provided a method of catalytic cracking in which the catalytic material flows concurrently with the flow of the hot vapors to be cracked. Concurrent flow enables us to produce maximum yields per pass of a premium motor fuel having an increased octane number. Static bodies of catalyst in contact with reactant vapors are avoided and more accurate control over the flow of the catalyst is exercised.

Side reactions occasioned by the contact of hot, freshly cracked hydrocarbons with more active catalyst material are avoided. Smaller amounts of fixed gases are produced. Our apparatus enables us to accurately control the flow of the catalytic material and to govern the amount of catalytic material to be employed, depending on the particular type of oil to be cracked and the particular type of catalytic material to be used. Once the operating conditions have been established for a particular type of crude oil being charged, our process may be run continuously without the necessity of shutting the plant to recharge the catalytic material.

It will be understood that certain features and sub-combinations are of utility and may be employed without reference to other features and sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, we claim:

A catalyst chamber comprising in combination a plurality of vertical open end tubes positioned in said chamber, means for introducing catalyst material to the upper end of said tubes for passage therethrough, closure plates mounted on a reciprocable support and positioned below the lower end of said tubes, each of said closure plates having an imperforate section and a section having a perforation therein, each of said sections being adapted to be alternately brought into alignment with the lower end of one of said tubes upon reciprocation of the closure plates thereby permitting the intermittent flow of catalyst material through the perforation, a pair of flanged members extending downwardly from said plates on each side of each perforation, a fixed plate positioned beneath said flanged members and adapted to define a catalyst receiving chamber therewith of a definite volumetric capacity.

LOUIS C. RUBIN.
WALTER B. MONTGOMERY.
WILLIAM J. DEGNEN.